United States Patent
Nukariya et al.

(10) Patent No.: US 9,933,966 B2
(45) Date of Patent: Apr. 3, 2018

(54) STORAGE CONTROL DEVICE AND COMPUTER SYSTEM

(71) Applicant: FUJITSU LIMITED, Kawasaki-shi, Kanagawa (JP)

(72) Inventors: Atsushi Nukariya, Kawagoe (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 14/937,363

(22) Filed: Nov. 10, 2015

(65) Prior Publication Data
US 2016/0162216 A1 Jun. 9, 2016

(30) Foreign Application Priority Data
Dec. 4, 2014 (JP) .................................. 2014-245504

(51) Int. Cl.
*G06F 1/32* (2006.01)
*G06F 3/06* (2006.01)

(52) U.S. Cl.
CPC .......... *G06F 3/0625* (2013.01); *G06F 1/3221* (2013.01); *G06F 1/3268* (2013.01); *G06F 3/065* (2013.01); *G06F 3/067* (2013.01); *G06F 3/0634* (2013.01); *G06F 3/0635* (2013.01); *G06F 3/0685* (2013.01); *G06F 3/0689* (2013.01); *Y02B 60/1246* (2013.01)

(58) Field of Classification Search
CPC .... G06F 1/3221; G06F 1/3268; G06F 3/0625; G06F 3/0634; G06F 3/0646–3/0647; G06F 11/2053–11/2094; G06F 1/32–1/3287; G06F 12/00–12/16; H04N 21/231–21/2318
See application file for complete search history.

(56) References Cited

U.S. PATENT DOCUMENTS 8,006,111 B1 8/2011 Faibish et al.
2002/0124137 A1* 9/2002 Ulrich .................. G06F 3/0613
711/113

(Continued)

FOREIGN PATENT DOCUMENTS

EP 1 605 453 A2 12/2005
JP 2010-2942 1/2010

(Continued)

OTHER PUBLICATIONS

Extended European Search Report dated May 12, 2016 in corresponding European Patent Application No. 15193884.2.

(Continued)

*Primary Examiner* — Nicholas Simonetti
(74) *Attorney, Agent, or Firm* — Staas & Halsey LLP

(57) ABSTRACT

A storage control device includes a processor. The processor is configured to acquire a first size. The processor is configured to calculate, for each of a plurality of storage devices, a total size of first data stored in each of the plurality of storage devices. The first data satisfies a predetermined condition. The processor is configured to select the first data in an ascending order of the total size. A sum of the total size of the selected first data is the first size or less. The processor is configured to copy the selected first data from the plurality of storage devices to a first storage device different from the plurality of storage devices.

7 Claims, 12 Drawing Sheets

(56) References Cited

U.S. PATENT DOCUMENTS

| | | | |
|---|---|---|---|
| 2006/0101084 A1* | 5/2006 | Kishi | G06F 3/0608 |
| 2006/0218367 A1* | 9/2006 | Ukai | G06F 3/061 |
| | | | 711/165 |
| 2009/0319724 A1 | 12/2009 | Oe et al. | |
| 2010/0017632 A1* | 1/2010 | Cooper | G06F 1/3221 |
| | | | 713/320 |
| 2010/0257312 A1 | 10/2010 | Twigg | |
| 2011/0320690 A1* | 12/2011 | Petersen | G06F 3/0611 |
| | | | 711/103 |
| 2012/0023292 A1 | 1/2012 | Saito et al. | |
| 2012/0059994 A1* | 3/2012 | Montgomery | G06F 3/0617 |
| | | | 711/119 |
| 2013/0041875 A1 | 2/2013 | Kan et al. | |

FOREIGN PATENT DOCUMENTS

| | | |
|---|---|---|
| WO | WO 2009/032776 A2 | 3/2009 |
| WO | WO 2011/121869 A1 | 10/2011 |

OTHER PUBLICATIONS

Dennis Colarelli et al., " Massive Arrays of Idle Disks for Storage Archives", dated Jul. 26, 2002, Dept. of Computer Science, University of Colorado, Proceedings of the IEEE/ACM SC2002 Conference (SC '02), XP010893090, Nov. 16-22, 2002, pp. 1-11.

* cited by examiner

FIG.6

| FILE NAME | DATA SERVER IP ADDRESS | DISK IDENTIFIER | FILE SIZE [kB] | CACHE |
|---|---|---|---|---|
| AAA.dat | 192.168.1.10 | A | 690 | HELD |
| BBB.dat | 192.168.1.10 | C | 1,020,776 | |
| CCC.dat | 192.168.1.3 | F | 90,176 | HELD |
| DDD.dat | 192.168.1.3 | D | 120 | HELD |
| FFF.dat | 192.168.1.10 | C | 56,000 | |
| GGG.dat | 192.168.1.10 | B | 620,778 | |
| ⋮ | ⋮ | ⋮ | ⋮ | ⋮ |

| DISK IDENTIFIER | TOTAL SIZE OF TARGET FILE LIST |
|---|---|
| A | 176,113 |
| B | 10,765,334 |
| C | 164 |
| D | 2,789,110 |
| E | 35,789 |
| F | 662,115 |

| DISK IDENTIFIER | TOTAL SIZE OF TARGET FILE LIST |
|---|---|
| C | 164 |
| E | 35,789 |
| A | 176,113 |

STORAGE CONTROL DEVICE AND COMPUTER SYSTEM

CROSS-REFERENCE TO RELATED APPLICATION

This application is based upon and claims the benefit of priority from the prior Japanese Patent Application No. 2014-245504, filed on Dec. 4, 2014, the entire contents of which are incorporated herein by reference.

FIELD

The embodiments discussed herein are related to a storage control device and a computer system.

BACKGROUND

In recent years, with the redundant arrays of inexpensive disks (RAID) technology, a disk array which realizes high-speed data access and high capacity by redundantly arranging a plurality of storage devices (e.g., hard disk drive (HDD) or solid state drive (SSD)) is widely used. In the meantime, as the number of storage devices increases in order to increase the capacity of the disk array, the amount of power consumed by the disk array increases. As a result, from the standpoint of reducing power costs and environmental loads, researches and developments of power saving in the disk array have been in progress.

As a technique for achieving power consumption reduction of the disk array, there is so called "massive array of idle disk (MAID)". The MAID is a technology for reducing the power consumption by causing a storage device in which data access has not occurred in the disk array to shift to a power saving mode (e.g., reduction of a disk rotational speed, stop of the disk rotation, retraction of a disk head, power-off, or the like). In the disk array to which the MAID is applied, since the storage device with data access is operated normally, an influence on the high speed performance and reliability is low.

However, when data access occurs in a storage device in the power saving mode, it takes time for the storage device to return to a normal operation mode, and the data access is delayed. In order to suppress the delay, there has been proposed a technique for estimating a probability of data access to the data to be written, and determining a storage device as a writing destination on the basis of the estimated probability. Further, a distributed storage system has been proposed, which includes a storage device having a disk array and a cache server for caching data with concentrated data access.

Related techniques are disclosed in, for example, International Publication Pamphlet No. WO 2011/121869 and Japanese Laid-open Patent Publication No. 2010-002942.

If a storage device storing a large amount of data with low probability of data access is shifted to a power saving mode, it is possible to reduce a risk such as a decrease in a high speed performance due to a data access occurring in the storage device in the power saving mode. However, an effect of the risk reduction is not expected if accuracy of the estimation is low. If data with high access frequency is saved in a cache server, since the cache server may respond to a case where access to the saved data occurs, it is possible to reduce a risk such as a decrease in high speed performance of data access.

However, since there is a limit to the storage capacity of the cache server, it is practically difficult to cache the data with high access frequency in all the storage devices. When storage devices in which all the data with high access frequency has been cached is shifted to the power saving mode and the other storage devices are operated in the normal operation mode, the high speed performance of data access is maintained. However, the number of storage devices shifted to the power saving mode is limited. As a result, the effect of reducing the power consumption becomes limited.

SUMMARY

According to an aspect of the present invention, provided is a storage control device including a processor. The processor is configured to acquire a first size. The processor is configured to calculate, for each of a plurality of storage devices, a total size of first data stored in each of the plurality of storage devices. The first data satisfies a predetermined condition. The processor is configured to select the first data in an ascending order of the total size. A sum of the total size of the selected first data is the first size or less. The processor is configured to copy the selected first data from the plurality of storage devices to a first storage device different from the plurality of storage devices.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a management database according to the second embodiment;

DESCRIPTION OF EMBODIMENTS

Figure 1:
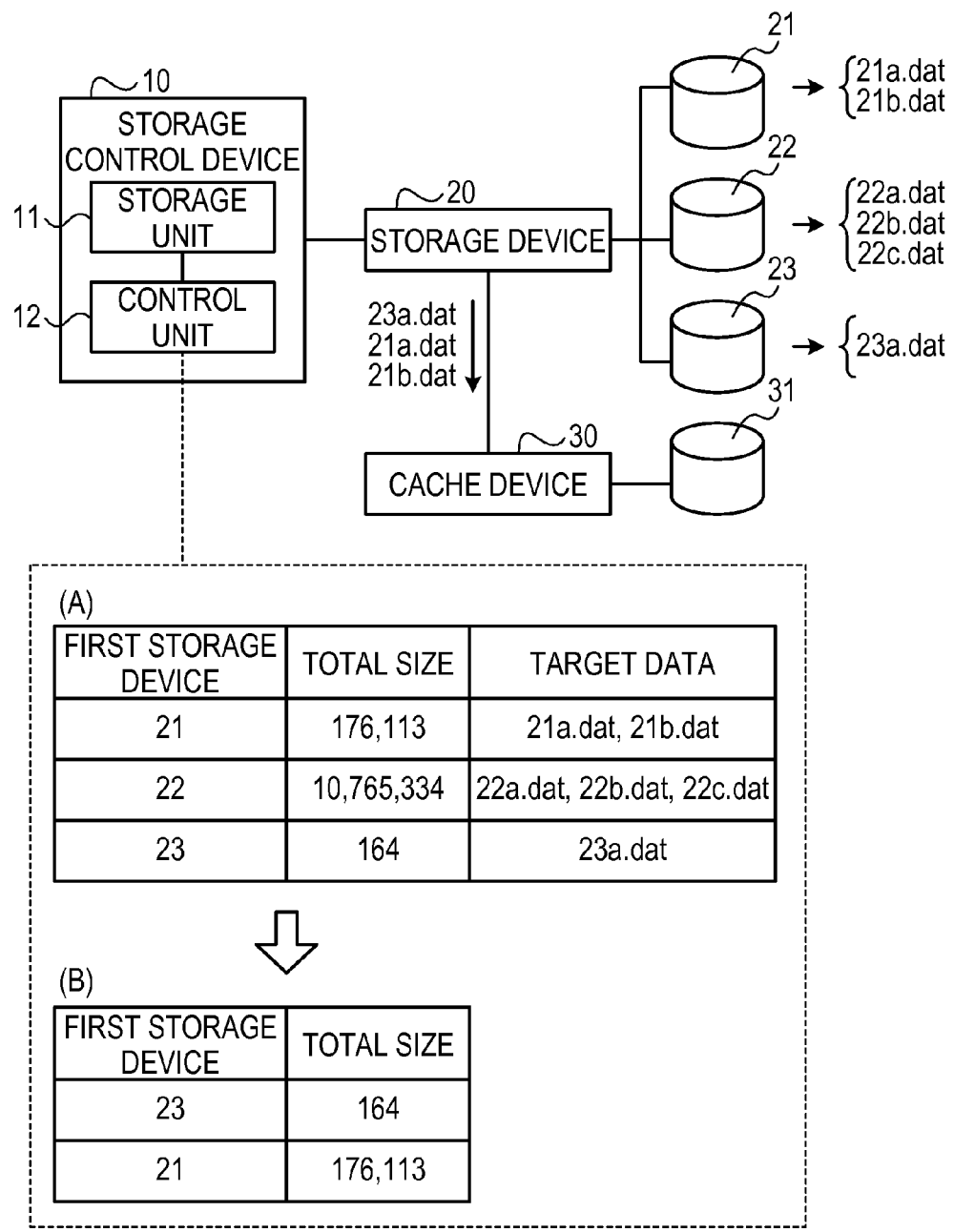
FIG. 1 is a diagram illustrating an example of a computer system according to a first embodiment.

Hereinafter, embodiments of the present disclosure will be described with reference to the accompanying drawings. Throughout the specification and drawings, similar reference numerals will be given to similar parts having a similar function, and a redundant description thereof will be omitted.

1. First Embodiment

A first embodiment will be described with reference to FIG. 1. FIG. 1 is a diagram illustrating an example of a computer system according to the first embodiment.

As illustrated in FIG. 1, a computer system according to the first embodiment includes a storage control device 10, a storage device 20, and a cache device 30. The storage device 20 manages reading/writing of data from/to first storage devices 21, 22, and 23 which are connected directly or via a network to the storage device 20. The cache device 30 manages reading/writing of data from/to a second storage device 31 which is connected directly or via a network to the cache device 30.

The number of the storage devices 20, the number of the first storage devices, the number of the cache devices 30 and the number of the second storage devices may be set arbitrarily. The storage control device 10, the storage device 20, and the cache device 30 may be connected via a wired or wireless network, or may be connected via a dedicated line. A technique according to the first embodiment is applicable to not only a small-scale RAID device, but also a large-scale distributed storage system.

The storage control device 10 has a storage unit 11 and a control unit 12. The storage unit 11 is a volatile storage device such as a random access memory (RAM), or a nonvolatile storage device such as an HDD or a flash memory. The control unit 12 is a processor such as a central processing unit (CPU) or a digital signal processor (DSP). The control unit 12 may be an electronic circuit such as an application specific integrated circuit (ASIC) or a field programmable gate array (FPGA). The control unit 12 executes, for example, a program stored in the storage unit 11 or another memory.

In the storage unit 11, information about the data stored in the first storage devices 21, 22, and 23 is stored. The information about the data includes, for example, identification information (such as a file name or the like) for identifying the data, identification information of the first storage device storing the data, identification information (such as an internet protocol (IP) address) of the storage device 20 managing the first storage device, the data size, and the like.

The control unit 12 controls the storage device 20 to store data satisfying set conditions among the data stored in each of the first storage devices 21, 22, and 23 into the second storage device 31. The set conditions may be, for example, that an access frequency to target data is larger than a preset threshold value, and the like. The control for storing the data satisfying the set conditions into the second storage device 31 is carried out, for example, when a new cache device or a new second storage device is added, or when a preset period of time has elapsed after the control is performed.

In order to perform the above control, the control unit 12 obtains the size of data to be stored in the second storage device 31. In this case, the control unit 12 may inquire of the storage device 20 about the size of the data and obtain the size of the data from the storage device 20, or may obtain the size of the data from the information about the data stored in the storage unit 11.

The control unit 12 calculates a total size of data to be stored in the second storage device 31 for each of the first storage devices 21, 22, and 23. For example, as illustrated in (A) of FIG. 1, the control unit 12 identifies the data (21a.dat, 21b.dat in the example of FIG. 1) satisfying the set conditions among the data stored in the first storage device 21 as the target data, and calculates the total size of the target data. Further, the control unit 12 stores the identification information of the first storage device 21 in association with the calculated total size of the target data in the storage unit 11. Similarly, the control unit 12 calculates the total size of the target data for each of the first storage devices 22 and 23, and stores the calculated total size of the target data in association with the identification information in the storage unit 11.

The control unit 12 stores the data satisfying the set conditions into the second storage device 31 from the first storage devices 23 and 21 in an ascending order of the total size. For example, as illustrated in (B) of FIG. 1, the control unit 12 refers to the total size that is stored in the storage unit 11, and determines the first storage devices (first storage devices 23 and 21 in this example) in an ascending order of the total size. At this time, the control unit 12 determines the first storage devices so that the sum of the total sizes corresponding to the determined first storage devices is smaller than an available capacity of the second storage device 31. The control unit 12 transmits, to the storage device 20, instructions for controlling the target data of the first storage devices 23 and 21 to be stored into the second storage device 31.

Upon receiving the instructions, the storage device 20 reads out the target data (23a.dat, 21a.dat, 21b.dat in this example) from the first storage devices 23 and 21, and transmits the target data to the cache device 30. The cache device 30 stores the target data received from the storage device 20 in the second storage device 31. When the storage of the target data in the second storage device 31 is completed, the cache device 30 transmits a response indicating completion of storage to the storage device 20.

Upon receiving the response, the storage device 20 causes the first storage devices 23 and 21 storing the target data stored in the second storage device 31 to shift to a power saving mode. The shift to the power saving mode is, for example, a reduction of a disk rotational speed, stop of the disk rotation, a retraction of a disk head, power-off, or the like. Then, the storage device 20 transmits, to the storage control device 10, a notification indicating that the shift to the power saving mode has been completed. Upon receiving the notification, the control unit 12 stores, in the storage unit 11, information of the first storage devices 23 and 21 shifted to the power saving mode.

By applying the technique of the first embodiment, since the target data is cached in the second storage device 31 in an ascending order of the total size, it is possible to cause more first storage devices to shift to the power saving mode, and it is possible to reduce more power consumption of the entire system. Further, since the target data (such as data with high access frequency) is cached in the second storage device 31, a risk of a delay caused by a process of returning from the power saving mode to a normal operation mode is low, and the high speed performance of data access is also maintained.

The first embodiment has been described. Next, a second embodiment will be described.

2. Second Embodiment

2.1. System

Figure 2:
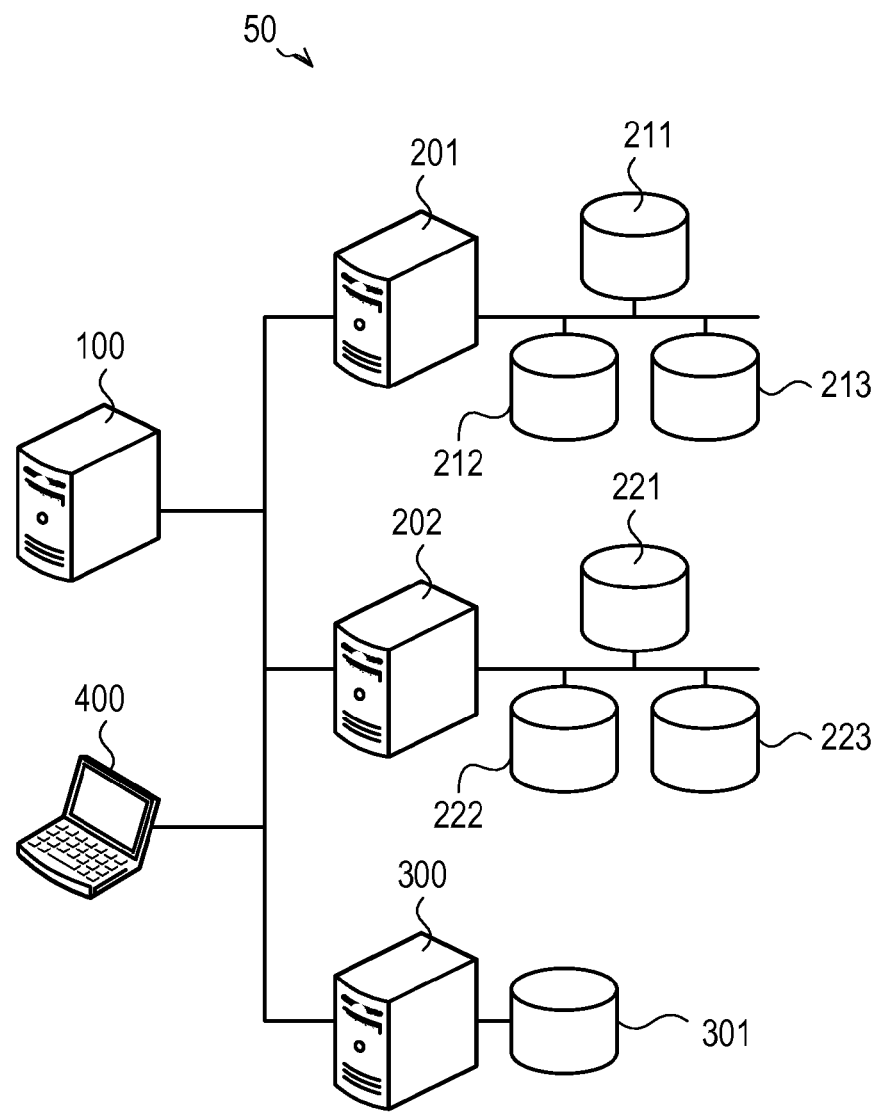
FIG. 2 is a diagram illustrating an example of a storage system according to a second embodiment

FIG. 2 is a diagram illustrating an example of a storage system according to the second embodiment. A storage system 50 illustrated in FIG. 2 is an example of a storage system according to the second embodiment.

As illustrated in FIG. 2, the storage system 50 includes a meta-server 100, data servers 201 and 202, a cache server 300, and a client device 400. Storage devices 211, 212, and 213 are connected to the data server 201. Storage devices 221, 222, and 223 are connected to the data server 202. A storage device 301 is connected to the cache server 300. Each of the storage devices 211, 212, 213, 221, 222, 223, and 301 is one or a plurality of HDDs, SSDs, or the like.

The client device 400 requests the meta-server 100 for writing or reading of data. The meta-server 100 receives the request from the client device 400 and notifies a storage location of the requested data to the client device 400.

A data server 201 manages the storage devices 211, 212, and 213 serving as storage locations of the data. A data server 202 manages the storage devices 221, 222, and 223 serving as storage locations of the data. The client device 400 accesses a data server that manages the storage location notified by the meta-server 100, and performs the writing or reading of data.

The cache server 300 manages the storage device 301 which functions as a cache disk. A part of the data stored in the storage devices 211, 212, 213, 221, 222, and 223 is copied to the storage device 301. When a storage device of a copy source is in the power saving mode (e.g., reduction of a disk rotational speed, stop of the disk rotation, retraction of a disk head, power-off, or the like), the storage device 301 is utilized in place of the storage device.

Figure 3:
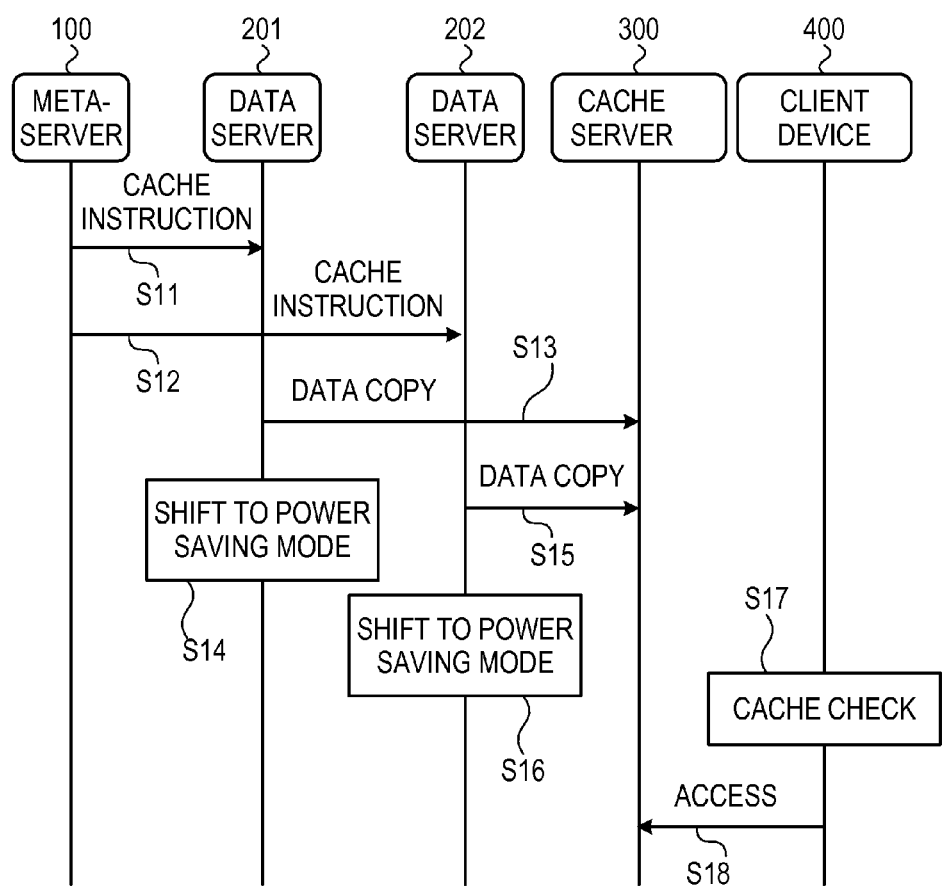
FIG. 3 is a sequence diagram illustrating a processing flow performed by the storage system according to the second embodiment.

Hereinafter, a processing flow relating to the data copying to the cache disk and access to the cache server 300 will be described with reference to FIG. 3. FIG. 3 is a sequence diagram illustrating a processing flow performed by the storage system according to the second embodiment.

The processing illustrated in FIG. 3 is performed when an available storage device is added as a cache disk, or when a predetermined duration has elapsed after the processing is performed previously. (S11) The meta-server 100 instructs (cache instruction) the data server 201 to copy the data stored in the storage devices 211, 212, and 213 onto the storage device 301 of the cache server 300. At this time, the meta-server 100 instructs to copy data with high access frequency among the data stored in the storage devices 211, 212, and 213 managed by the data server 201 onto the storage device 301.

(S12) The meta-server 100 instructs (cache instruction) the data server 202 to copy the data stored in the storage devices 221, 222, and 223 onto the storage device 301 of the cache server 300. At this time, the meta-server 100 instructs to copy data with high access frequency among the data stored in the storage devices 221, 222, and 223 managed by the data server 202 onto the storage device 301.

The processing order of S11 and S12 may be changed. (S13) Upon receiving the cache instruction, the data server 201 reads out the data with high access frequency instructed by the meta-server 100 from the storage devices 211, 212, and 213. Then, the data server 201 transmits (data copy) the read data to the cache server 300 to store the data in the storage device 301.

(S14) Upon completing the data copy, the data server 201 causes a storage device among the storage devices 211, 212, and 213, for which all the data with high access frequency has been copied, to shift to the power saving mode. Thus, by causing the storage device to shift to the power saving mode, it is possible to suppress the power consumption of the storage system 50.

(S15) Upon receiving the cache instruction, the data server 202 reads out the data with high access frequency instructed by the meta-server 100 from the storage devices 221, 222, and 223. Then, the data server 202 transmits (data copy) the read data to the cache server 300 to store the data in the storage device 301.

(S16) Upon completing the data copy, the data server 202 causes a storage device among the storage devices 221, 222, and 223, for which all the data with high access frequency has been copied, to shift to the power saving mode. Thus, by causing the storage device to shift to the power saving mode, it is possible to suppress the power consumption of the storage system 50.

(S17) The client device 400 checks, when reading out the data, whether the target data to be read out has been already stored in the storage device 301 of the cache server 300 (i.e., whether there is a cache). In this example, it is assumed that the target data to be read out has been already stored in the storage device 301. (S18) In this case, the client device 400 accesses the cache server 300 and acquires the target data from the storage device 301.

As described above, by copying data with high access frequency onto the storage device 301 of the cache server 300, the storage devices managed by the data servers 201 and 202 may be set to the power saving mode, and the power consumption of the storage system 50 may be suppressed.

Even when the access to the storage device which is set to the power saving mode is generated, if the data has been cached, the client device 400 may acquire the target data to be read out by accessing the cache server 300. That is, in many cases, since the required data is obtained without returning the storage device in the power saving mode to the normal operation mode, it is possible to suppress a risk such as a reduction in access speed.

As described above, it is possible to achieve the power saving while suppressing the deterioration of access performance by utilizing the cache server 300. However, if it is possible to cause more storage devices to shift to the power saving mode, it is possible to further suppress the power consumption.

Since the power consumption and an increase in access performance have a trade-off relationship, the access performance usually tends to be reduced when the power saving is performed. Therefore, the second embodiment provides a technique for reducing power consumption in the storage system 50 while suppressing the deterioration of access performance by devising a caching method.

2.2. Hardware

Figure 4:
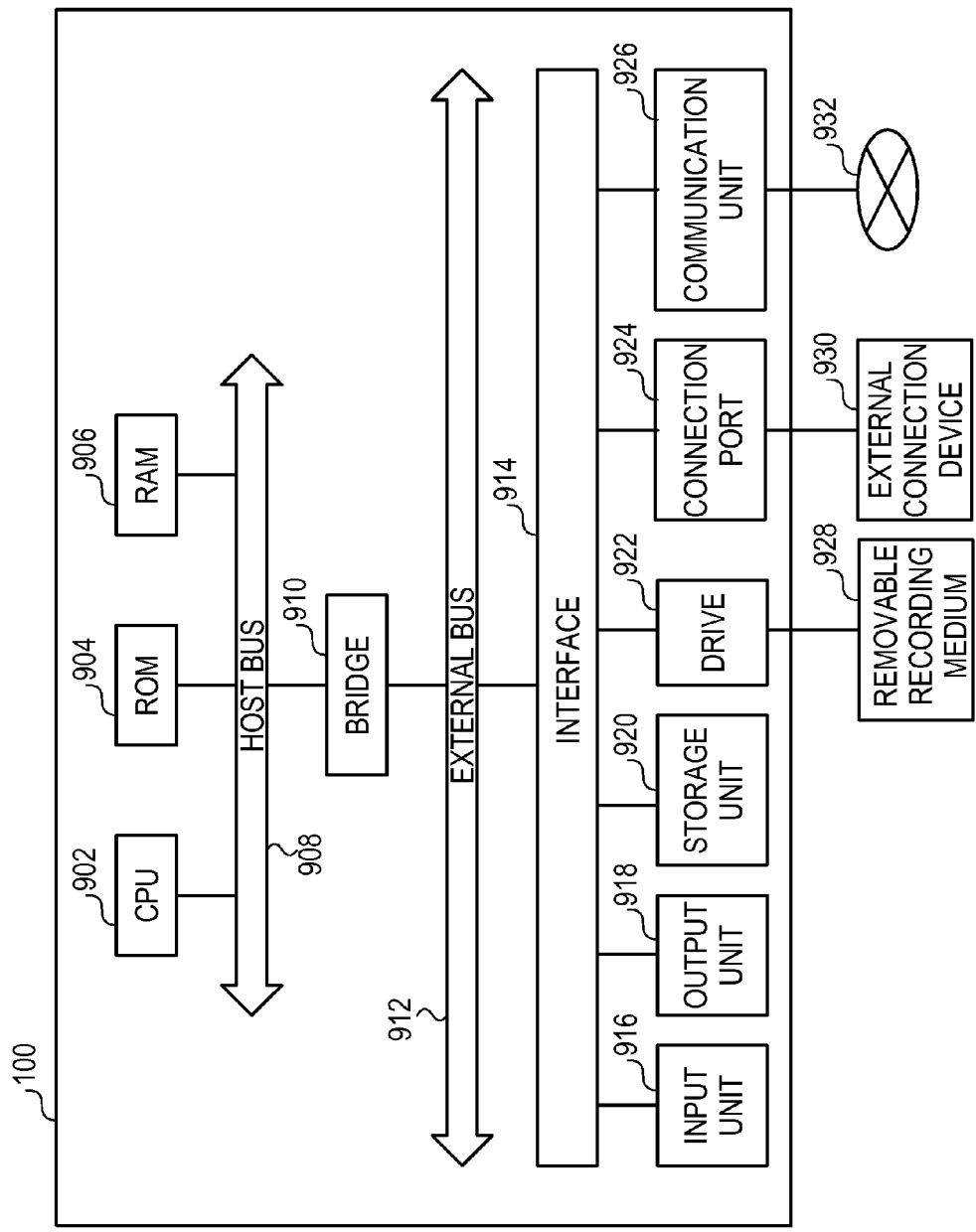
FIG. 4 is a diagram illustrating an example of hardware capable of implementing a function of a meta-server according to the second embodiment.

Hereinafter, an example of hardware of the meta-server 100 will be described with reference to FIG. 4. FIG. 4 is a diagram illustrating an example of hardware capable of implementing a function of a meta-server according to the second embodiment.

The function of the meta-server 100 may be implemented, for example, by using hardware resources of an information processing apparatus illustrated in FIG. 4. That is, the function of the meta-server 100 may be realized by controlling the hardware illustrated in FIG. 4 by using a computer program.

As illustrated in FIG. 4, this hardware mainly includes a CPU 902, a read-only memory (ROM) 904, RAM 906, a host bus 908, and a bridge 910. Further, this hardware includes an external bus 912, an interface 914, an input unit 916, an output unit 918, a storage unit 920, a drive 922, a connection port 924, and a communication unit 926.

The CPU 902 functions as, for example, an arithmetic processing unit or a control unit, and controls the overall operation of each constituent element or a part thereof on the basis of various programs recorded in the ROM 904, the RAM 906, the storage unit 920 or a removable recording medium 928. The ROM 904 is an example of a storage device for storing, for example, data used for an operation or program read by the CPU 902. The RAM 906 temporarily or permanently stores, for example, a program read by the CPU 902 or various parameters and the like that change when the program is executed.

These elements are connected to each other, for example, via the host bus 908 capable of performing high-speed data transmission. The host bus 908 is connected, for example, to the external bus 912 having a relatively low data transmission speed via the bridge 910. As the input unit 916, for example, a mouse, a keyboard, a touch panel, a touch pad, buttons, switches, levers, and the like are used. Further, as the input unit 916, a remote controller capable of transmitting a control signal using infrared rays or other radio waves may be used.

As the output unit 918, for example, a display device such as a cathode ray tube (CRT), a liquid crystal display (LCD), a plasma display panel (PDP), or an electro-luminescence display (ELD) is used. Further, as the output unit 918, an audio output device such as a speaker or headphones, or a printer, etc. may also be used. That is, the output unit 918 is a device capable of outputting information visually or audibly.

The storage unit 920 is a device for storing various types of data. As the storage unit 920, for example, a magnetic storage device such as an HDD is used. In addition, as the storage unit 920, a semiconductor storage device such as an SSD or a RAM disk, an optical storage device, or a magneto-optical storage device may be used.

The drive 922 is a device for reading information recorded in the removable recording medium 928 that is a detachable recording medium, or writing information to the removable recording medium 928. As the removable recording medium 928, for example, a magnetic disk, an optical disk, a magneto-optical disk, a semiconductor memory, or the like is used.

The connection port 924 is a port for connecting an external connection device 930, for example, a universal serial bus (USB) port, IEEE1394 port, small computer system interface (SCSI), RS-232C port, an optical audio terminal, or the like. As the external connection device 930, for example, a printer or the like is used.

The communication unit 926 is a communication device for connecting to a network 932. As the communication unit 926, for example, a communication circuit for wired or wireless local area network (LAN), a communication circuit for wireless USB (WUSB), a communication circuit or a router for optical communication, a communication circuit or a router for asymmetric digital subscriber line (ADSL), a communication circuit for a mobile phone network, or the like is used. The network 932 connected to the communication unit 926 is a network connected in a wired or wireless manner, and includes, for example, the Internet, LAN, broadcast network, a satellite communication line, and the like.

The example of hardware of the meta-server 100 has been described. Further, the functions of the data servers 201 and 202, the cache server 300, and the client device 400 may be implemented by utilizing the hardware resources illustrated in FIG. 4. Therefore, a description of the hardware of the data servers 201 and 202, the cache server 300, and the client device 400 is omitted.

2.3. Functions

Figure 5:
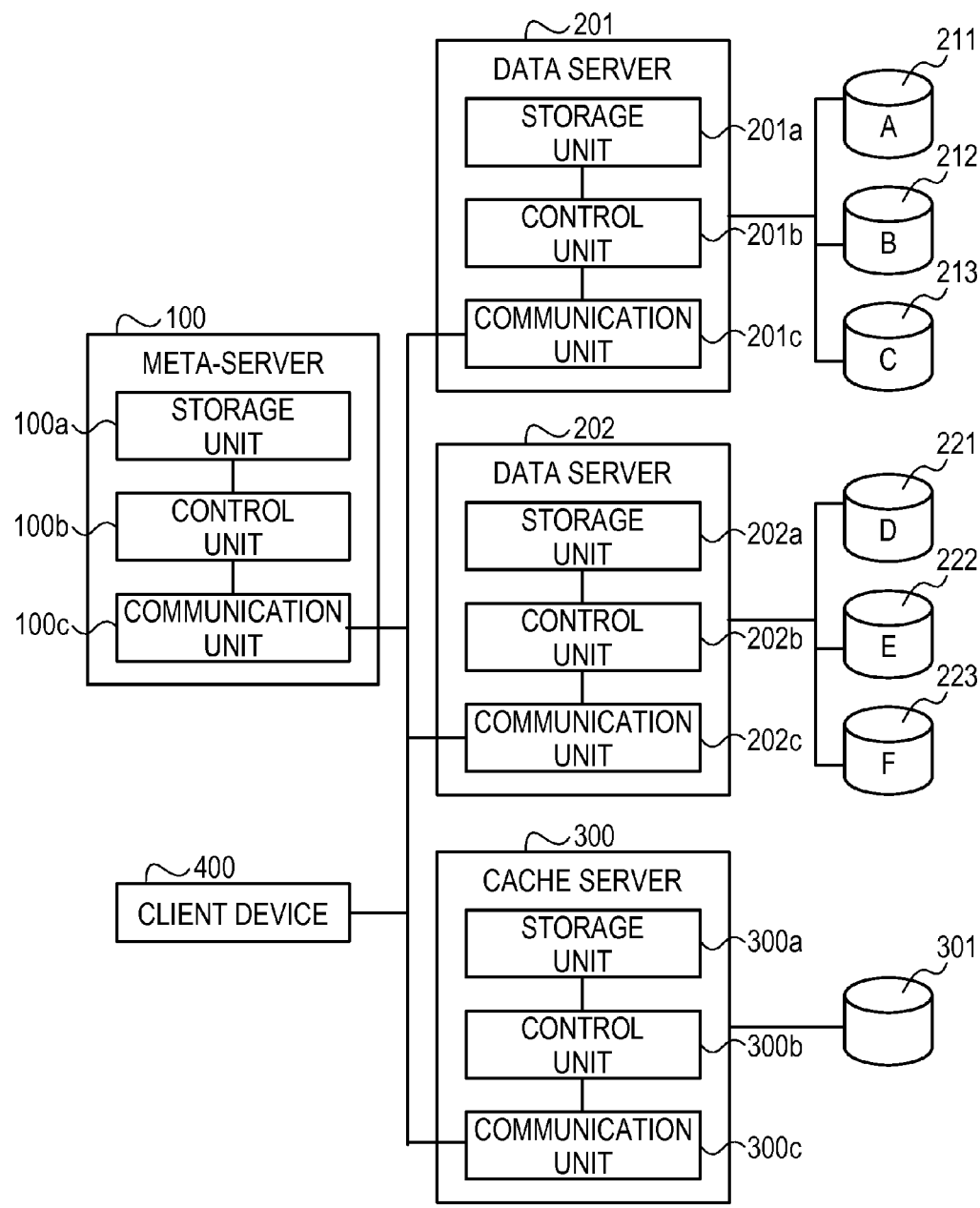
FIG. 5 is a block diagram illustrating main functions of the meta-server, data servers and a cache server according to the second embodiment.

Next, the functions of the meta-server 100, the data servers 201 and 202, and the cache server 300 will be described. FIG. 5 is a block diagram illustrating main functions of the meta-server, the data servers, and the cache server according to the second embodiment.

As illustrated in FIG. 5, the meta-server 100 includes a storage unit 100a, a control unit 100b, and a communication unit 100c. The function of the storage unit 100a may be implemented by using the above-described RAM 906, storage unit 920, or the like. The function of the control unit 100b may be implemented by using the above-described CPU 902 or the like. The function of the communication unit 100c may be implemented by using the above-described connection port 924, communication unit 926, or the like.

A management database illustrated in FIG. 6 is stored in the storage unit 100a. FIG. 6 is a diagram illustrating an example of a management database according to the second embodiment. In the management database, information about data files stored in the storage devices 211, 212, 213, 221, 222, and 223 is recorded.

For example, a file name of a data file, IP addresses of the data servers 201 and 202, a disk identifier, a file size, and information indicating whether cache data is held are recorded in the management database. The IP addresses are an example of identification information for identifying the data servers 201 and 202. The disk identifier is an example of identification information for identifying each of the storage devices 211, 212, 213, 221, 222, and 223. The information indicating whether cache data is held is information indicating whether the data has been already stored in the storage device 301 of the cache server 300.

In the example of FIG. 6, a data file having a file name "AAA.dat" is associated with an IP address "192.168.1.10", a disk identifier "A", a file size "690 kB", and information indicating that cache data is "held".

With reference to this information, the control unit 100b may recognize that the data file AAA.dat is stored in a storage device (storage device 211) of the disk identifier A managed by a data server (data server 201) having the IP address 192.168.1.10. The control unit 100b may recognize that the data size of the data file AAA.dat is 690 kB, and the data file AAA.dat has been already stored in the storage device 301 of the cache server 300.

When a data file stored in the storage devices 211, 212, 213, 221, 222, and 223 is updated, the control unit 100b updates the management database. Hereinafter, for the simplicity of description, it is assumed that the disk identifier of the storage device 211 is "A", the disk identifier of the storage device 212 is "B", and the disk identifier of the storage device 213 is "C". Further, it is assumed that the disk identifier of the storage device 221 is "D", the disk identifier of the storage device 222 is "E", and the disk identifier of the storage device 223 is "F". In addition, it is assumed that the IP address of the data server 201 is "192.168.1.10", and the IP address of the data server 202 is "192.168.1.3".

The control unit 100b performs a caching process when an available storage device is added as a cache disk, or when a predetermined duration has elapsed after the previous caching process is performed. The caching process is a process of copying data with high access frequency stored in the storage devices 211, 212, 213, 221, 222, and 223 managed by the data servers 201 and 202 onto the storage device 301 of the cache server 300.

In order to perform the caching process, the control unit 100b acquires an access status (number of times of reading and writing data) of each data file from the data servers 201 and 202, and calculates an access frequency for determining a data file to be copied to the storage device 301. For example, the control unit 100b calculates the access frequency whenever the caching process is performed. An access frequency AW(t) at time t when the caching process is performed is calculated, for example, on the basis of the following Equation (1):

$$AW(t)=RA(t)+AW(t-1)\times WT \qquad (1)$$

AW(t−1) represents an access frequency at time t−1 when the previous caching process is performed. RA(t) represents the number of accesses that have occurred to the target data file during a period until the current caching process after the previous caching process. WT is a weight and a value (for example, ½) satisfying a condition "0<WT<1" is set in advance as WT. The first term on the right side of the Equation (1) represents an access frequency occurring in the most recent period, and the second term on the right side represents an influence of the access frequencies before the time t−1.

For example, the control unit 100b may store, in the storage unit 100a, the number of accesses for each data file acquired from the data servers 201 and 202 during the caching process, and calculate RA(t) by subtracting the previously acquired number of accesses from the currently acquired number of accesses. The control unit 100b stores the access frequency AW(t) calculated on the basis of the Equation (1) in the storage unit 100a and uses the access frequency AW(t) during the next calculation.

The control unit 100b identifies data files having an access frequency AW(t) greater than a preset reference value, and creates a target file list that describes the identified data files. At this time, the control unit 100b refers to the management database, and describes, in the target file list, data files that are not stored in the storage device 301 of the cache server 300.

Figure 7:
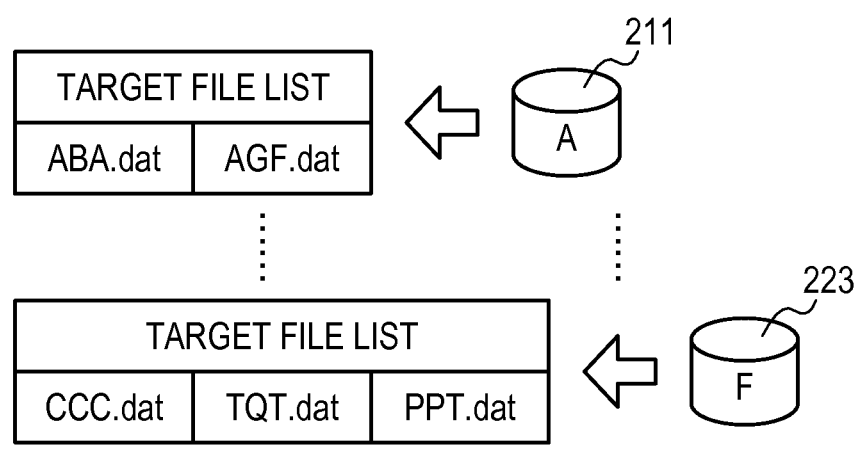
FIG. 7 is a diagram illustrating an example of target file lists according to the second embodiment.

The control unit 100b, as illustrated in FIG. 7, creates a target file list for each of the storage devices 211, 212, 213, 221, 222, and 223. The control unit 100b stores the target file lists in the storage unit 100a. FIG. 7 is a diagram illustrating an example of target file lists according to the second embodiment.

Figure 8:
FIG. 8 is a diagram illustrating an example of a provisional target disk list and a target disk list according to the second embodiment.

The control unit 100b refers to the management database to calculate a total size (total file size) of data files that are described in a target file list. The control unit 100b refers to the management database to create a provisional target disk list associating the calculated total size with a disk identifier (see FIG. 8). FIG. 8 is a diagram illustrating an example of a provisional target disk list and a target disk list according to the second embodiment.

The control unit 100b sorts the records of the provisional target disk list (upper list in FIG. 8) in an ascending order of the total size, and selects records sequentially from the top to the extent that the sum of the total sizes of the selected records does not exceed an available capacity of the storage device 301 of the cache server 300. Then, the control unit 100b creates a target disk list (lower list in FIG. 8) having the records selected from the provisional target disk list and stores the target disk list in the storage unit 100a.

The control unit 100b reads out target file lists (see FIG. 7) corresponding to disk identifiers in the target disk list from the storage unit 100a. Then, the control unit 100b instructs (cache instruction) the data servers 201 and 202 to copy the data files described in the read target file lists onto the storage device 301 of the cache server 300 by using the communication unit 100c. Upon receiving the cache instruction, the data servers 201 and 202 perform data copy and shift to the power saving mode as illustrated in FIG. 3.

As described above, by calculating the total size of the data files having high access frequency for each storage device, and setting the data files to be cached in an ascending order of the total size, it is possible to increase the number of storage devices for which all the data files to be cached are cached. As a result, the number of storage devices that may shift to the power saving mode is increased, and it is possible to more greatly reduce the power consumption of the storage system 50.

The data server 201 includes a storage unit 201a, a control unit 201b, and a communication unit 201c. The function of the storage unit 201a may be implemented by using the above-described RAM 906, storage unit 920, or the like. The function of the control unit 201b may be implemented by using the above-described CPU 902 or the like. The function of the communication unit 201c may be implemented by using the above-described connection port 924, communication unit 926, or the like.

Information about data files stored in the storage devices 211, 212, and 213 is stored in the storage unit 201a. For example, the control unit 201b monitors the number of times of reading and writing for each data file, and records the number of times, as the number of accesses, in the storage unit 201a. At this time, the control unit 201b records the number of accesses in association with the storage device storing the data file in the storage unit 201a. The control unit 201b provides the number of accesses recorded in the storage unit 201a in response to a request received from the meta-server 100.

The storage unit 201a stores therein setting information regarding the power saving mode. The setting information includes, for example, mode information indicating which one of reduction of the disk rotational speed, stop of the disk rotation, retraction of the disk head, power-off, or the like as the power saving mode. Further, the setting information includes parameter information such as the disk rotational speed in the power saving mode. The control unit 201b controls the storage devices 211, 212, and 213 on the basis of the setting information stored in the storage unit 201a when shifted to the power saving mode.

The above-described setting information also includes information regarding the normal operation mode. The control unit 201b controls the storage devices 211, 212, and 213 on the basis of the setting information when returning from the power saving mode to the normal operation mode. For example, when the control unit 201b receives access to a data file that is not stored in the storage device 301 of the cache server 300, and if the storage device storing the data file is in the power saving mode, the storage device is returned to the normal operation mode on the basis of the setting information.

Upon receiving a cache instruction specifying data files to be cached from the meta-server 100, the control unit 201b transmits the specified data files to the cache server 300 via the communication unit 201c. The control unit 201b checks that the cache server 300 has finished the storage of the transmitted data files in the storage device 301, and causes the storage device storing the specified data files to shift to the power saving mode.

The data server 202 includes a storage unit 202*a*, a control unit 202*b*, and a communication unit 202*c*. The function of the storage unit 202*a* may be implemented by using the above-described RAM 906, storage unit 920, or the like. The function of the control unit 202*b* may be implemented by using the above-described CPU 902 or the like. The function of the communication unit 202*c* may be implemented by using the above-described connection port 924, communication unit 926, or the like. The operation of the data server 202 is similar to the data server 201, and thus its description is omitted.

The cache server 300 includes a storage unit 300*a*, a control unit 300*b*, and a communication unit 300*c*. The function of the storage unit 300*a* may be implemented by using the above-described RAM 906, storage unit 920, or the like. The function of the control unit 300*b* may be implemented by using the above-described CPU 902 or the like. The function of the communication unit 300*c* may be implemented by using the above-described connection port 924, communication unit 926, or the like.

The storage unit 300*a* stores information about the storage device 301 such as an available capacity of the storage device 301. The control unit 300*b* provides the available capacity by referring to the storage unit 300*a* when receiving an inquiry about the available capacity of the storage device 301 from the meta-server 100.

Upon receiving data files to be cached from the data servers 201 and 202 via the communication unit 300*c*, the control unit 300*b* stores the received data files in the storage device 301. Upon completing the storage of the data files, the control unit 300*b* sends a completion notification to a transmission source of the data files. Upon receiving a request for reading out a data file from the client device 400, the control unit 300*b* reads out the data file from the storage device 301 and transmits the data file to the client device 400.

The functions of the meta-server 100, the data servers 201 and 202, and the cache server 300 have been described. As described above, by calculating the total size of the data files having high access frequency for each storage device, and allowing the data files to be cached in an ascending order of the total size, it is possible to increase the number of storage devices for which all the data files to be cached are cached. As a result, the number of storage devices that may shift to the power saving mode is increased, and it is possible to more greatly reduce the power consumption of the storage system 50.

2.4. Processing Flow

Next, there will be described a processing flow performed by the meta-server 100 and the data servers 201 and 202 in the caching process. Since the processing performed by the data server 201 is substantially the same as the processing performed by the data server 202, the processing of the data server 201 will be described herein.

Figure 9:
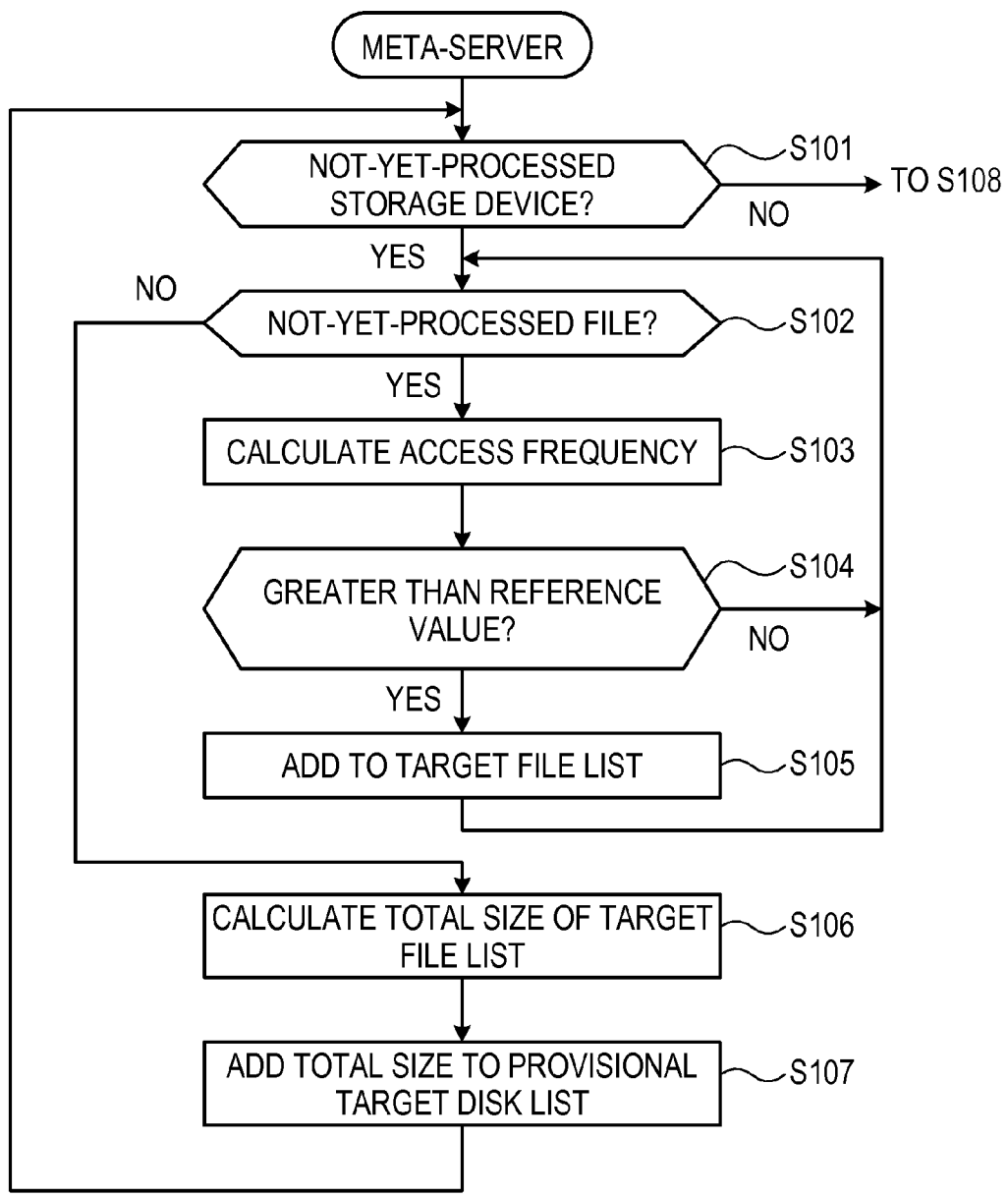
FIG. 9 is a first flowchart illustrating a processing flow performed by the meta-server according to the second embodiment.
Figure 10:
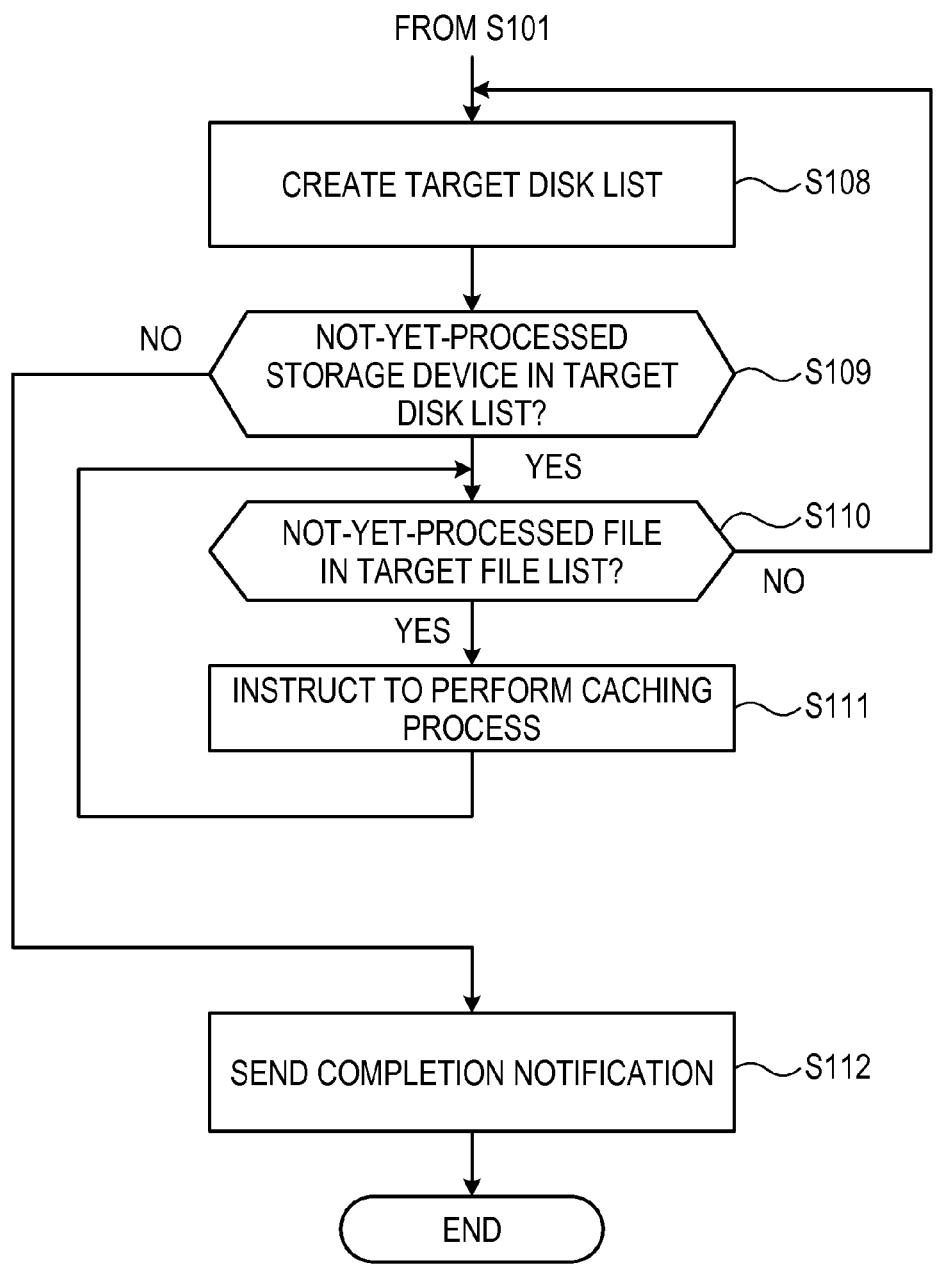
FIG. 10 is a second flowchart illustrating a processing flow performed by the meta-server according to the second embodiment.

A processing flow performed by the meta-server 100 will be described with reference to FIGS. 9 and 10. FIG. 9 is a first flowchart illustrating a processing flow performed by a meta-server according to the second embodiment. FIG. 10 is a second flowchart illustrating a processing flow performed by a meta-server according to the second embodiment.

The processing illustrated in FIGS. 9 and 10 is performed, for example, at a timing when an available storage device is added as a cache disk or when a predetermined period of time has elapsed after performing the previous caching process. The processing may be performed at an arbitrary timing by an administrator of the storage system 50 or the like, or may be set to be performed at a preset irregular timing.

(S101) When the caching process is started, the control unit 100*b* determines whether there is a not-yet-processed storage device (storage device on which the processing in S102 and after has not been performed) among the storage devices managed by the data servers 201 and 202. If there is a not-yet-processed storage device, one not-yet-processed storage device is selected by the control unit 100*b* and the process proceeds to S102. If there is no not-yet-processed storage device, the process proceeds to S108 in FIG. 10.

(S102) The control unit 100*b* determines whether there is a not-yet-processed file (data file on which the processing in S103 and after has not been performed) in the not-yet-processed storage device selected in S101. If there is a not-yet-processed file, one not-yet-processed file is selected by the control unit 100*b* and the process proceeds to S103. If there is no not-yet-processed file, the process proceeds to S106.

(S103) The control unit 100*b* calculates an access frequency for the not-yet-processed file selected in S102. The access frequency is calculated on the basis of the above-described Equation (1). For example, the control unit 100*b* acquires the number of accesses of the not-yet-processed file from the data server, and calculates RA(t) included in the Equation (1) by subtracting the number of accesses acquired in the previous caching process from the currently acquired number of accesses. Further, the control unit 100*b* calculates the current access frequency AW(t) for the not-yet-processed file by using the access frequency AW(t−1) calculated in the previous caching process.

(S104) The control unit 100*b* determines whether the access frequency calculated in S103 is greater than a preset reference value. If the access frequency is greater than the reference value, the process proceeds to S105. If the access frequency is not greater than the reference value, the process proceeds to S102. The reference value may be set in advance by an administrator of the storage system 50 or the like, on the basis of an empirical rule conforming to the standard operating conditions, or may be set as an appropriate value obtained by simulation or experiments.

(S105) The control unit 100*b* adds the data file selected as a not-yet-processed file in S102 to the target file list (see FIG. 7) corresponding to the storage device selected as a not-yet-processed storage device in S101. When the processing in S105 is completed, the process proceeds to S102.

(S106) The control unit 100*b* refers to the management database stored in the storage unit 100*a* to calculate a total size that is the sum of the file sizes for the data files described in the target file list for each storage device.

(S107) The control unit 100*b* adds the total size calculated in S106 together with the disk identifier of the corresponding storage device to the provisional target disk list (see upper list in FIG. 8). When the processing in S107 is completed, the process proceeds to S101.

(S108) The control unit 100*b* creates a target disk list on the basis of the provisional target disk list. For example, the control unit 100*b* sorts the records of the provisional target disk list in an ascending order of the total size, and selects records sequentially from the top to the extent that the sum of the total sizes in the selected records does not exceed the available capacity of the storage device 301 of the cache server 300. Then, the control unit 100*b* creates the target disk list (see lower list in FIG. 8) having the records selected from the provisional target disk list.

(S109) The control unit 100b determines whether there is a not-yet-processed storage device (a storage device on which the processing in S110 and after has not been performed) in the target disk list. If there is a not-yet-processed storage device, one not-yet-processed storage device is selected by the control unit 100b and the process proceeds to S110. If there is no not-yet-processed storage device, the process proceeds to S112.

(S110) The control unit 100b determines whether there is a not-yet-processed file (a data file on which the processing in S111 has not been performed) in the target file list corresponding to the not-yet-processed storage device selected in S101. If there is a not-yet-processed file, one not-yet-processed file is selected by the control unit 100b and the process proceeds to S111. If there is no not-yet-processed file, the process proceeds to S108.

(S111) The control unit 100b instructs the data server to perform the caching process on the not-yet-processed file selected in S110. At this time, the control unit 100b refers to the management database to identify a data server that manages the storage device storing the not-yet-processed file, and specifies the not-yet-processed file to instruct the identified data server to perform the caching process.

By the instruction (cache instruction), the not-yet-processed file is read out from the storage device of the data server, and is written into the storage device 301 of the cache server 300 (see FIG. 3). When the processing in S111 is completed, the process proceeds to S110.

(S112) The control unit 100b sends a completion notification to all data servers (data servers 201 and 202). When the processing in S112 is completed, the processing illustrated in FIGS. 9 and 10 is terminated.

The processing flow performed by the meta-server 100 has been described.

Figure 11:
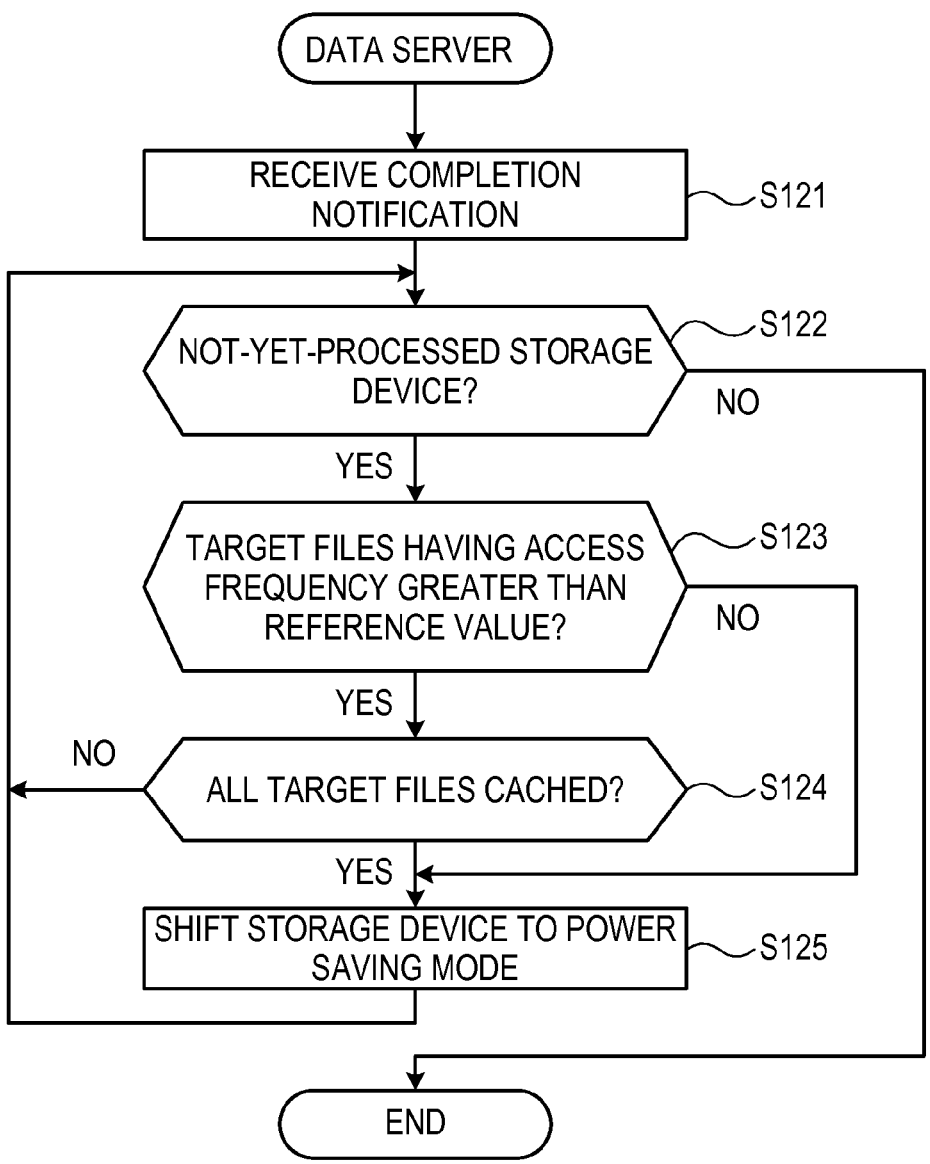
FIG. 11 is a flowchart illustrating a processing flow performed by the data server according to the second embodiment.

Next, a processing flow performed by the data server 201 will be described with reference to FIG. 11. FIG. 11 is a flowchart illustrating a processing flow performed by a data server according to the second embodiment. (S121) The control unit 201b receives a completion notification from the meta-server 100. (S122) The control unit 201b determines whether there is a not-yet-processed storage device (a storage device on which the processing in S123 and after has not been performed) under management. If there is a not-yet-processed storage device, one not-yet-processed storage device is selected by the control unit 201b, and the process proceeds to S123. If there is no not-yet-processed storage device, the processing illustrated in FIG. 11 is terminated.

(S123) The control unit 201b determines whether there are one or more target files (data files specified by the meta-server 100) having an access frequency greater than the reference value in the not-yet-processed storage device selected in S122. If there are one or more target files, the process proceeds to S124. If there is no target file, the process proceeds to S125.

(S124) The control unit 201b determines whether all target files have been cached (copied to the storage device 301 of the cache server 300). If all target files have been cached, the process proceeds to S125. If there is a target file that has not been cached, the process proceeds to S122.

(S125) The control unit 201b causes the not-yet-processed storage device selected in S122 to shift to the power saving mode. When the processing in S125 is completed, the process proceeds to S122. The processing flow performed by the data server 201 has been described.

Figure 12:
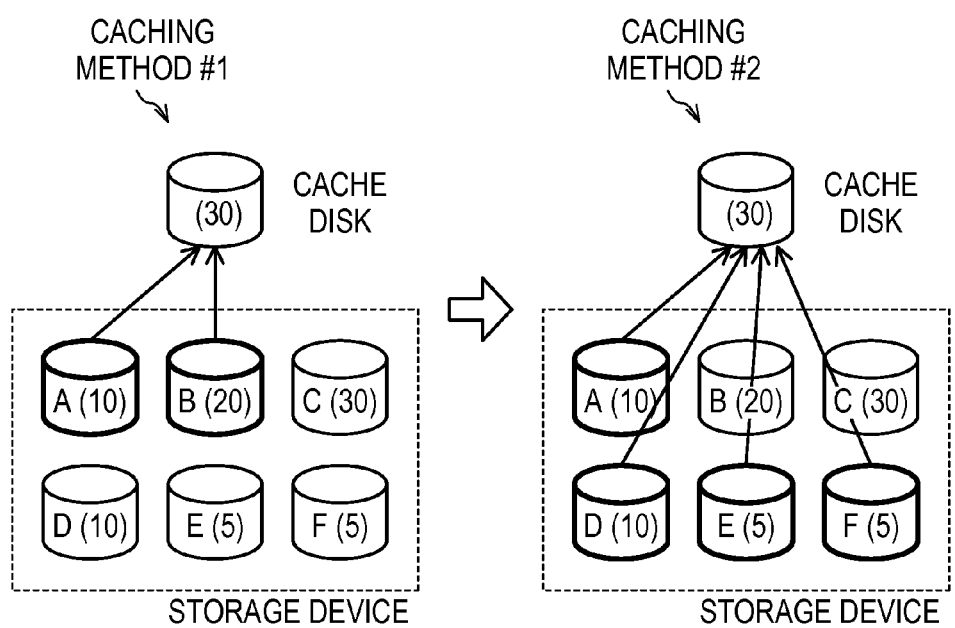
FIG. 12 is a diagram illustrating an example of an effect of a caching method according to the second embodiment.

Hereinafter, an effect in the case of applying the caching method illustrated in FIGS. 9 to 11 will be described with reference to FIG. 12. FIG. 12 is a diagram illustrating an example of an effect of the caching method according to the second embodiment.

A, B, . . . , F in FIG. 12 represent disk identifiers of storage devices managed by a data server, and the number in parentheses next to the disk identifier represents a total size of data files having high access frequency stored in a storage device. The number in parentheses affixed to the cache disk represents an available capacity. Caching Method #1 illustrates a method for caching data files in the order of the disk identifiers. Meanwhile, Caching Method #2 illustrates a caching method of applying the technique according to the second embodiment.

In the case of Caching Method #1, the data files are copied to the cache disk in the order of the disk identifiers. The total size of files to be cached in the storage device of the disk identifier A is 10, and the total size of files to be cached in the storage device of the disk identifier B is 20. Since the available capacity of the cache disk is 30, for these two storage devices (having the disk identifiers A and B), the data files to be cached are cached in the cache disk.

In the case of Caching Method #2, the data files are copied to the cache disk in an ascending order of the total size of files to be cached. The total size of files to be cached in the storage device of the disk identifier A is 10, the total size of files to be cached in the storage device of the disk identifier D is 10, and the total size of files to be cached in the storage devices of the disk identifiers E and F is 5. That is, compared to the storage devices of the disk identifiers B and C, the total size of files to be cached is small in the storage devices of the disk identifiers A, D, E, and F. Therefore, for these four storage devices (having the disk identifiers A, D, E, and F), the data files to be cached are cached in the cache disk.

In the case of Caching Method #1, two storage devices A and B may shift to the power saving mode. Meanwhile, in the case of Caching Method #2, four storage devices A, D, E, and F may shift to the power saving mode. In other words, Caching Method #2 may cause more storage devices to shift to the power saving mode, thereby further reducing the power consumption of the storage system 50. Since the data file having high access frequency is stored in the cache disk, it is possible to respond quickly even when an access to the data file occurs.

Thus, by applying the technology according to the second embodiment, it is possible to further reduce power consumption while suppressing a decrease in access speed. The second embodiment has been described.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:
1. A storage control device, comprising:
a memory; and
a processor that is coupled to the memory and controls a data storage between a first storage device and a second storage device, and the processor configured to:

acquire a storage capacity of the second storage device;
identify target data having an access frequency higher than a predetermined threshold value in each of a plurality of storage devices included in the first storage device;
calculate a total size of the target data in each of the plurality of storage devices;
sort the plurality of storage devices in ascending order based on the total size of the target data and select, in ascending order, at least one of the plurality of storage devices such that a sum of the total size of the target data from the at least one selected storage device is less than an available storage capacity of the second storage device; and
copy the target data from the at least one selected storage device to the second storage device,
wherein the second storage device has a higher access speed than the first storage device.

2. The storage control device according to claim 1, wherein
the processor is configured to cause an operation mode of all or a portion of the plurality of storage devices from which the target data is copied to the second storage device to shift from a normal mode to a power saving mode in which power consumption is lower than in the normal mode.

3. A non-transitory computer-readable recording medium having stored therein a program that causes a computer to execute a process for controlling a data storage between a first storage device and a second storage device, the process comprising:
acquiring a storage capacity of the second storage device;
identifying target data having an access frequency higher than a predetermined threshold value in each of a plurality of storage devices included in the first storage device;
calculating a total size of target data in each of the plurality of storage devices;
sorting the plurality of storage devices in ascending order based on the total size of the target data and selecting, in ascending order, at least one of the plurality of storage devices such that a sum of the total size of the target data from the at least one selected storage device is less than an available storage capacity of the second storage device; and
copying the target data from the at least one selected storage device to the second storage device,
wherein the second storage device has a higher access speed than the first storage device.

4. A computer system, comprising:
a plurality of storage devices;
a first storage device different from the plurality of storage devices; and a storage control device including:
a processor that controls a data storage between the plurality of storage devices and the first storage device, and is configured to
acquire a storage capacity of the first storage device,
identify target data having an access frequency higher than a predetermined threshold value in each of the plurality of storage devices,
calculate a total size of the target data in each of the plurality of storage devices, sort the plurality of storage devices in ascending order based on the total size of the target data and select, in ascending order, at least one of the plurality of storage devices such that a sum of the total size of the target data from the at least one selected storage device is less than an available storage capacity of the first storage device; and
copy the target data from the at least one selected storage device to the first storage device,
wherein the first storage device has a higher access speed than the plurality of storage devices.

5. A storage control device, comprising:
a memory unit including a plurality of storage devices;
a cache device storing a portion of data from the plurality of storage devices of the memory unit; and
a processor in communication with the memory unit and the cache device, wherein the processor is configured to:
identify target data having an access frequency higher than a predetermined threshold value in each of the plurality of storage devices of the memory unit;
calculate a total size of the target data in each of the plurality of storage devices;
sort the plurality of storage devices in ascending order based on the total size of the target data and select, in ascending order, at least one of the plurality of storage devices such that a sum of the total size of the target data from the at least one selected storage device is less than an available storage capacity of the memory unit; and
copy the target data from the at least one selected storage device to the memory unit.

6. The storage device of claim 5, wherein the processor is further configured to shift an operation mode of the plurality of storage devices from which the target data is copied into the cache device from a normal mode to a power saving mode in which power consumption is lower than the normal mode.

7. The storage device of claim 5, wherein the sum of the total size of the target data of the plurality of storage devices is controlled to be smaller than a total storage capacity of the cache device by excluding at least one of the plurality of storage devices from the ascending order of the plurality of storage devices.

* * * * *